Patented May 24, 1949

2,471,144

UNITED STATES PATENT OFFICE

2,471,144

SALT SUBSTITUTE

Edward D. Davy, Delmar, N. Y., assignor to Sterling Drug Inc., New York, N. Y., a corporation of Delaware No Drawing. Application December 2, 1948, Serial No. 63,220

9 Claims. (Cl. 99—143)

The present invention relates to a substitute for common table salt (sodium chloride NaCl) and more particularly to a salty-tasting preparation adapted for use by those requiring a sodium-free diet.

It is well known that in certain cardica and renal conditions, particularly when associated with edema, hypertension, arteriosclerosis, pregnancy complications, epilepsy and Gerson tuberculosis diet, the diet must be salt-free in order to avoid further damage and to ameliorate these conditions to the extent that control of diet can do so. It is further known that the deleterious action of common table salt is due to the sodium content thereof, since it is the sodium in the form of sodium ions which must be specifically avoided. Since this robs the diet of a good deal of palatability, many patients continue to use common table salt even though it should not be used by them. Consequently, continued or further damage results or such patients fail to obtain alleviation of their condition.

Some attempts have been made to find a satisfactory substitute for common table salt which will give the same or a similar seasoning effect and which is free of sodium and any other deleterious ions. To this end potassium chloride, ammonium chloride and similar compounds have been suggested and, to some extent, employed in a limited, experimental manner. While these compounds are free from the objectionable sodium ions, they are not acceptable as a substitute for sodium chloride because of their markedly different taste and gustatory effect.

The present invention is predicated upon the discovery that a combination of sodium-free compounds of the character hereinafter set forth constitutes a highly effective and satisfactory substitute for common table salt. This preparation is composed of a major amount, at least two-thirds and desirably in the range of 70–95% of potassium and ammonium chlorides, the potassium chloride being present in an amount several times that of the ammonium chloride, desirably in the ratio of from 3 to 1 to 20 to 1, and preferably about 5 to 1; and, in addition, a minor amount, about 2–10% and preferably about 5% of magnesium, calcium, formate and citrate ions. In addition, my new preparation involves the use of a diluent and binder, by means of which the concentration of active ingredients can be adjusted to that desired while, at the same time, offsetting any hygroscopicity and separation of the several ingredients, thus keeping the preparation sufficiently dry to remain free-flowing while keeping the preparation uniform and homogeneous.

Although a mixture of potassium and ammonium chlorides alone has a saline taste, said taste is disagreeable. I have found that the addition of relatively small amounts of magnesium, calcium, formate and citrate ions is particularly effective in "smoothing out" this taste and rendering it much more similar to that of sodium chloride.

Following are listed a number of compositions, together with percentages of ingredients by weight, which have been found satisfactory as salt substitutes.

I

|  | Per cent |
|---|---|
| Potassium chloride | 77 |
| Ammonium chloride | 15.5 |
| Starch | 2.5 |
| Potassium formate | 3 |
| Calcium formate | 1 |
| Magnesium citrate | 1 |

|  | II | III | IV | V |
|---|---|---|---|---|
|  | Per cent | Per cent | Per cent | Per cent |
| Potassium Chloride | 66 | 66 | 66 | 66 |
| Ammonium Chloride | 12 | 12 | 12 | 12 |
| Starch | 17 | 17 | 17 | 17 |
| Potassium Citrate |  |  | 1 | 1 |
| Calcium Formate | 5 |  | 4 |  |
| Magnesium Formate |  | 5 |  | 4 |

A preferred and highly effective combination is represented by the following formula:

VI

|  | Per cent |
|---|---|
| Potassium chloride | 66 |
| Ammonium chloride | 12 |
| Starch | 17 |
| Potassium formate | 3 |
| Calcium formate | 1 |
| Magnesium citrate | 1 |
|  | 100 |

The above Formula VI is characterized by an excellent and agreeable saline taste which closely approximates that of common table salt but which is entirely sodium-free and therefore has none of the deleterious effects resulting from the use of sodium when the latter is contra indicated. The preparation is free from any bitter after-taste and is not excessively salty in taste to the user. The particular manner of forming the compounds above specified is not per se important. I have found, for example, that potassium formate can conveniently be produced by neutralizing formic acid with potassium hydroxide. Similarly, calcium formate is prepared by neutralizing formic acid with calcium hydroxide. In each case the formate is produced in solution and the solution is then evaporated to produce the dry salt. Magnesium citrate is prepared by reacting citric acid and magnesium hydroxide and evaporating the solution to obtain the magnesium citrate therefrom. Potassium chloride and ammonium chloride can be obtained as such and need not be specially prepared. In each case, however, the purity and quality should be such that no undesired or deleterious impurities are present. Sodium compounds are entirely absent. I have found that starch is an eminently satisfactory diluent and binder and that the starch also keeps the preparation in a free-flowing, homogeneous condition. The preparation is reduced to 40-mesh for ultimate use. This is done by thoroughly mixing the various salts above referred to, screening the same to 40-mesh, slugging the resulting mixture and then grinding the slugs and re-screening to 40-mesh.

The Formula VI set forth above represents the preferred species of the invention having optimum properties and such preparation has found immediate and wide acceptance, thus indicating the previous lack of a satisfactory preparation of this character despite attempts made in the past to produce the same. It is to be understood, however, in view of the other compositions described, that the proportions above set forth may be somewhat varied; furthermore, other sodium-free salts may be substituted or the cation-anion distribution altered just so long as the cations and anions of the character specified are present; for example, the citrate could be in the form of ammonium citrate or potassium citrate and the magnesium citrate specified could be replaced by magnesium chloride with an appropriate addition of potassium citrate or ammonium citrate to the potassium chloride or ammonium chloride which is reduced in amount by the citrate quantity involved. Those versed in chemistry will appreciate that other or similar or analogous changes or substitutions may be made without departing from the spirit or principle hereof. The invention is rather that defined by the appended claims.

This application is a continuation-in-part of my earlier copending application, Serial No. 768,497.

I claim:

1. A sodium-free preparation adapted as a substitute for common table salt containing chlorides of potassium and ammonium constituting the primary saline constituents and being present in an amount of 70–95% of the total ingredients, the potassium chloride being present in an amount several times that of the ammonium chloride, the preparation containing in addition a small proportion of calcium and magnesium cations and citrate and formate anions.

2. A sodium-free preparation adapted as a substitute for common table salt containing chlorides of potassium and ammonium constituting the primary saline constituents and being present in an amount of 70–95% of the total ingredients, the potassium chloride being present in an amount ranging from three to twenty times that of the ammonium chloride, the preparation containing in addition about 2–5% of calcium and magnesium cations and citrate and formate anions.

3. A sodium-free preparation adapted as a substitute for common table salt containing chlorides of potassium and ammonium constituting the primary saline constituents and being present in an amount of 70–95% of the total ingredients, the potassium chloride being present in an amount ranging from three to twenty times that of the ammonium chloride, the preparation containing in addition a diluent-binder of inert character and about 2–5% of calcium and magnesium cations and citrate and formate anions.

4. A sodium-free preparation adapted as a substitute for common table salt containing chlorides of potassium and ammonium constituting the primary saline constituents and being present in an amount of 70–95% of the total ingredients, the potassium chloride being present in an amount of about five times that of the ammonium chloride, the preparation containing in addition a diluent-binder of inert character and about 5% of calcium and magnesium cations and citrate and formate anions.

5. A sodium-free preparation adapted as a substitute for common table salt containing chlorides of potassium and ammonium constituting the primary saline constituents and being present in an amount of at least two-thirds of the total ingredients, the potassium chloride being present in an amount approximating at least five times that of the ammonium chloride, the preparation containing in addition a small proportion and not more than 5% of calcium and magnesium cations and citrate and formate anions.

6. A sodium-free preparation adapted as a substitute for common table salt containing chlorides of potassium and ammonium constituting the primary saline constituents and being present in an amount of at least two-thirds of the total ingredients, the potassium chloride being present in an amount approximating at least five times that of the ammonium chloride, the preparation containing in addition a diluent-binder of inert character and a small proportion and not more than 5% of calcium and magnesium cations and citrate and formate anions.

7. A sodium-free preparation adapted as a substitute for common table salt and composed of the following ingredients in substantially the following proportions:

| | Grams |
|---|---|
| Potassium chloride | 66 |
| Ammonium chloride | 12 |
| Starch | 17 |
| Potassium formate | 3 |
| Calcium formate | 1 |
| Magnesium citrate | 1 |
| | 100 |

8. A sodium-free preparation adapted as a substitute for common table salt containing chlorides of potassium and ammonium constituting the primary saline constituents the preparation containing in addition a small proportion of calcium and magnesium cations and citrate and formate anions.

9. A sodium-free preparation adapted as a substitute for common table salt containing chlorides of potassium and ammonium constituting the primary saline constituents the preparation containing in addition a small proportion and not more than approximately 5% of calcium and magnesium cations and citrate and formate anions.

EDWARD D. DAVY.

REFERENCES CITED

The following references are of record in the file of this patent:

UNITED STATES PATENTS

| Number | Name | Date |
|---|---|---|
| 462,730 | Ongley | Nov. 10, 1891 |
| 1,874,055 | Liebrecht | Aug. 30, 1932 |

FOREIGN PATENTS

| Number | Country | Date |
|---|---|---|
| 421,554 | Great Britain | Dec. 24, 1934 |